US011156990B2

(12) United States Patent
Tsuzuki et al.

(10) Patent No.: US 11,156,990 B2
(45) Date of Patent: Oct. 26, 2021

(54) PRODUCTION MANAGEMENT SYSTEM

(71) Applicant: JTEKT CORPORATION, Osaka (JP)

(72) Inventors: Toshiyuki Tsuzuki, Anjo (JP); Tatsuo Oshiumi, Kariya (JP)

(73) Assignee: JTEKT CORPORATION, Osaka (JP)

( * ) Notice: Subject to any disclaimer, the term of this patent is extended or adjusted under 35 U.S.C. 154(b) by 124 days.

(21) Appl. No.: 16/295,282

(22) Filed: Mar. 7, 2019

(65) Prior Publication Data

US 2019/0278259 A1 Sep. 12, 2019

(30) Foreign Application Priority Data

Mar. 9, 2018 (JP) .............................. JP2018-043087

(51) Int. Cl.
*G05B 19/418* (2006.01)
(52) U.S. Cl.
CPC .................. *G05B 19/41865* (2013.01); *G05B 2219/31266* (2013.01)
(58) Field of Classification Search
CPC .......... G05B 19/4183; G05B 19/41865; G05B 2219/31266; G05B 2219/31315
See application file for complete search history.

(56) References Cited

U.S. PATENT DOCUMENTS 5,189,624 A * 2/1993 Barlow ................ G05B 19/182
700/169
5,374,231 A * 12/1994 Obrist ................ G05B 19/4183
483/15
6,094,793 A * 8/2000 Szuba ................ G05B 19/4083
198/345.3
2002/0010519 A1 * 1/2002 Watanabe ............ G06Q 10/087
700/83
2017/0308842 A1 10/2017 Tsuzuki et al.

FOREIGN PATENT DOCUMENTS

| JP | 4299005 | 7/2009 |
|----|---------|--------|
| JP | 2017-199150 | 11/2017 |
| JP | 2017-207889 | 11/2017 |

* cited by examiner

*Primary Examiner* — Yuhui R Pan
(74) *Attorney, Agent, or Firm* — Oblon, McClelland, Maier & Neustadt, L.L.P.

(57) ABSTRACT

A production management system includes a plurality of production facilities, a first operation instruction provider, and a management device. The first operation instruction provider gives a first operator an instruction to deliver workpiece into and out of a predetermined one of the production facilities in accordance with a production plan and operating statuses of the production facilities and acquires an operation status of each of the first operators. The management device transmits, to the production facility into which the workpiece has been delivered, process data for activation of the production facility in accordance with the status of delivery of the workpiece into and out of each of the production facilities. The management device stores the process data, operating status information on the production facilities, and operation status information on each of the first operators acquired from the first operation instruction provider, such that these pieces of information are stored in association with each other.

18 Claims, 11 Drawing Sheets

PRODUCTION MANAGEMENT SYSTEM

INCORPORATION BY REFERENCE

The disclosure of Japanese Patent Application No. 2018-043087 filed on Mar. 9, 2018, including the specification, drawings and abstract, is incorporated herein by reference in its entirety.

BACKGROUND OF THE INVENTION

1. Field of the Invention

The invention relates to production management systems.

2. Description of the Related Art

Production facilities (including machine tools and/or industrial robots) carry out production in accordance with production plans to process workpieces. Such production facilities include fully-automated facilities that do not require involvement of operators at all, and non-fully-automated facilities that require involvement of operators. Examples of operations that require involvement of operators include preparations for production at production facilities, such as delivery of workpieces into and out of production facilities and replacement of tools of production facilities.

The disclosure of Japanese Patent Application Publication No. 2017-199150 (JP 2017-199150 A) involves storing operation capabilities of operators in advance at a non-fully-automated facility, and providing a next operation instruction to the operator in accordance with his or her operation capability. The disclosure of Japanese Patent Application Publication No. 2017-207889 (JP 2017-207889 A) involves graphing the time required for an operation performed by each operator, and checking balance of a production line by a manager. The disclosure of Japanese Patent No. 4299005 involves managing versions of NC data for control of production facilities.

When an operator makes preparations for production, the preparations may be made in accordance with his or her decision. This does not necessarily result in efficient operations.

SUMMARY OF THE INVENTION

An object of the invention is to provide a production management system that enhances operation efficiency and enables more efficient production in accordance with a production plan.

A production management system according to an aspect of the invention includes a plurality of production facilities, a first operation instruction provider, and a management device. The production facilities each include a plurality of tools and a facility body to process, using the tools, a workpiece delivered into the facility body. The first operation instruction provider gives a first operator an instruction to deliver the workpiece into and out of a predetermined one of the production facilities in accordance with a production plan and operating statuses of the production facilities. The first operation instruction provider acquires an operation status of the first operator. The management device transmits, to the production facility into which the workpiece has been delivered by the first operator, process data for activation of the production facility in accordance with a status of delivery of the workpiece into and out of each of the production facilities. The management device stores the process data, operating status information on the production facilities acquired from the production facilities, and operation status information on the first operator acquired from the first operation instruction provider, such that these pieces of information are stored in association with each other.

The first operation instruction provider provides an operation instruction to the first operator in accordance with the production plan, and acquires the operation status of the first operator. The management device transmits, to the production facility into which the workpiece has been delivered by the first operator, the process data for activation of the production facility. The process of transmitting the process data is thus automatically performed by the management device in response to the operation performed by the first operator. This results in enhanced operation efficiency. The management device stores the process data, the operating status information on the production facilities, and the operation status information on the first operator such that these pieces of information are stored in association with each other. Using these pieces of information stored in association with each other makes it possible to carry out production in accordance with the production plan and to reduce occurrence of production errors. This results in enhanced production efficiency.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 2:
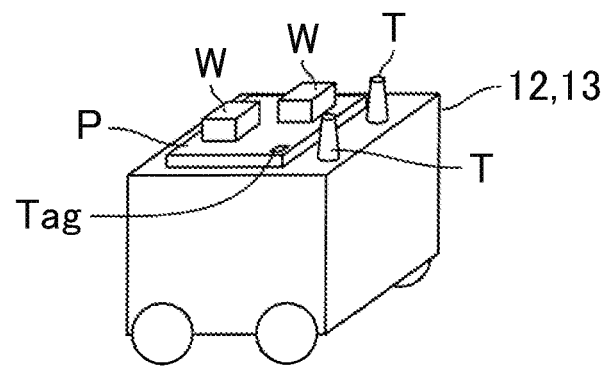
FIG. 2 is an enlarged view of a cart 12 or 13 and objects to be conveyed using the cart 12 or 13.
Figure 3:
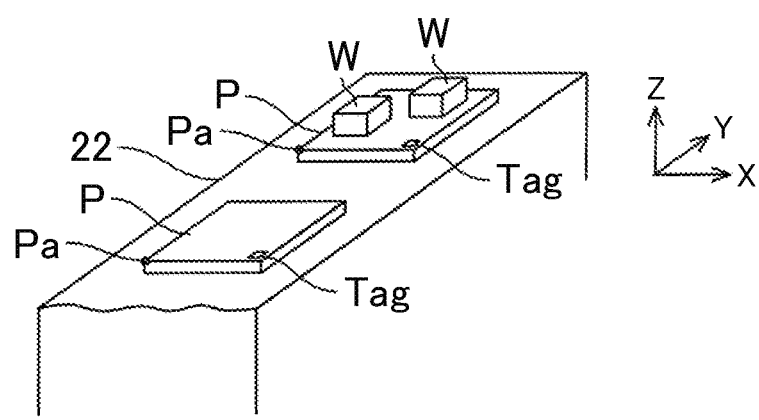
FIG. 3 is a diagram illustrating pallets P and workpieces W on a work table 22 in a workpiece set-up area 2*b*.

A production management system 1 will be described with reference to FIGS. 1 to 3. The production management system 1 is a system to process a plurality of workpieces W using a plurality of production facilities MC in accordance with a production plan. Using a plurality of tools T, the production facilities MC each process the workpieces W delivered thereinto. The production facilities MC are apparatuses that are able to process the workpieces W. Examples of the production facilities MC include: machine tools to carry out machining, such as cutting, grinding, forging, and electric discharge machining; and assembling machines to assemble parts, for example. As used herein, the term "tool T" refers to, for example, a cutting tool of a cutting machine or an assembling tool of an assembling machine.

Each production facility MC is able to start a process involving the use of the tools T in response to an operation on an activation button by a first operator A1 or A2. The present embodiment will be described on the assumption that each production facility MC is a numerically controlled (NC) machine tool to cut or grind the workpieces W.

Figure 1:
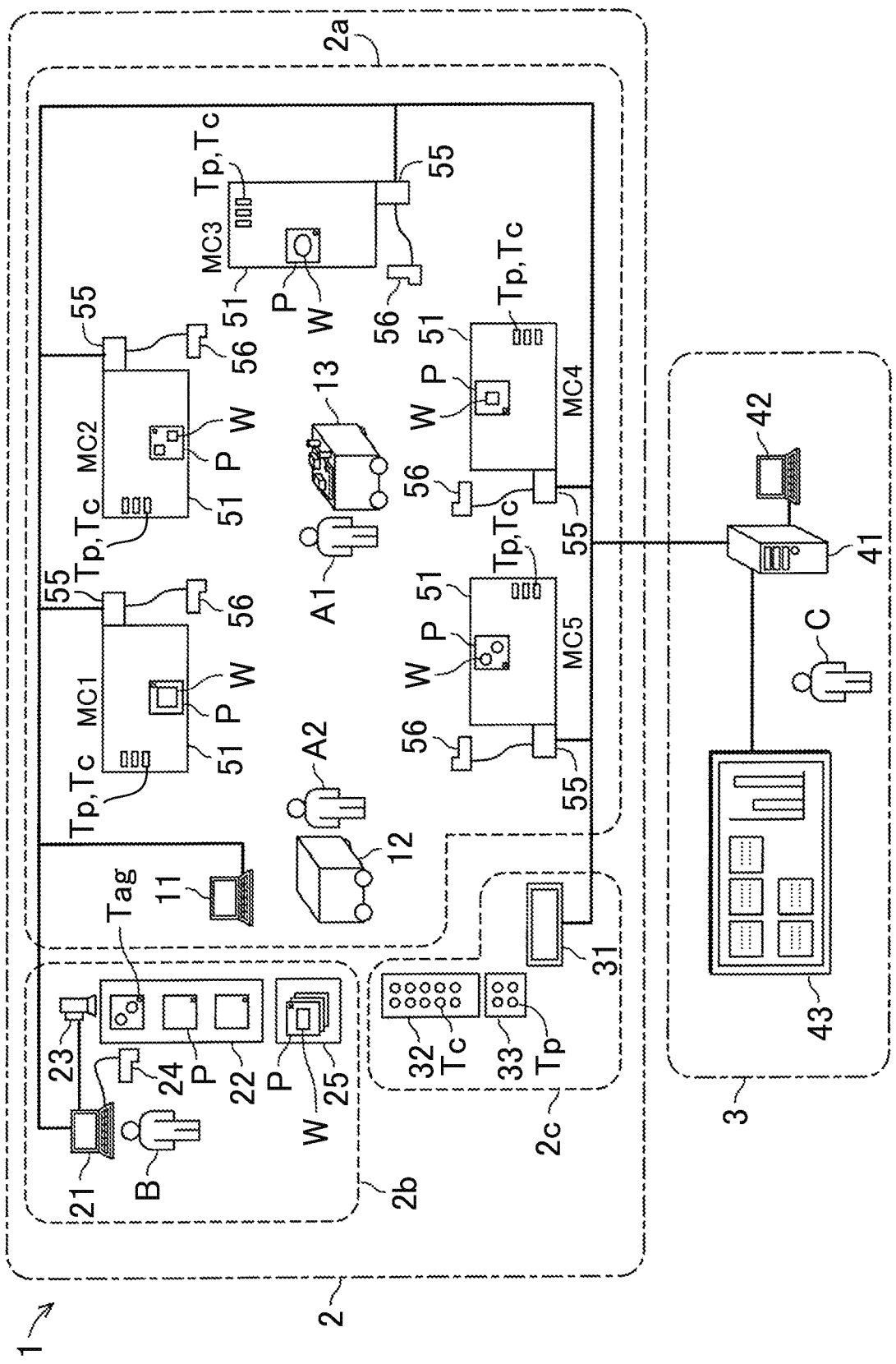
FIG. 1 is a diagram illustrating the layout of a production management system 1.

As illustrated in FIG. 1, an area for placement of apparatuses included in the production management system 1 is divided into a production area 2 and a management area 3. The production area 2 is an area where the production facilities MC are placed. The production facilities MC include production facilities MC1, MC2, MC3, MC4, and MC5. The production area 2 is thus an area where the workpieces W undergo a direct production process, such as machining. The management area 3 is a control area where each device in the production area 2 is managed by a manager C.

The production area 2 is divided into a facility area 2a, a workpiece set-up area 2b, and a tool set-up area 2c. The facility area 2a, the workpiece set-up area 2b, and the tool set-up area 2c are located adjacent to each other. The production facilities MC are arranged in the facility area 2a. Although the number of production facilities MC is five by way of example in FIG. 1, any number of production facilities MC may be arranged in the facility area 2a. In one example, the production facilities MC are arranged in a U shape, a single straight line, or two straight lines parallel to each other. In FIG. 1, the production facilities MC are arranged in a U shape by way of example.

Each of the production facilities MC is an apparatus to carry out a production process independently by way of example. The production facilities MC may be similar machining centers to carry out similar production processes, or machining center(s) and lathe(s) to carry out different production processes.

The first operators A1 and A2 are present in the facility area 2a. The first operators A1 and A2 each perform a first operation in accordance with details of a first operation instruction provided from an input-output device 11. The input-output device 11 is disposed adjacent to an opening defined by the production facilities MC arranged in a U shape. The position of the input-output device 11 is a home position (i.e., an operation reference position) for the first operations to be performed by the first operators A1 and A2.

The first operator A1 performs the first operation using a cart 13. The first operator A2 performs the first operation using a cart 12. As illustrated in FIGS. 1 and 2, the cart 12 is manually movable by the first operator A2, and the cart 13 is manually movable by the first operator A1. A pallet P to which the workpieces W are secured is placeable on each of the carts 12 and 13. The tools T for replacement are also placeable on each of the carts 12 and 13. In the present embodiment, the pallet P and the tools T to be delivered into and out of one of the production facilities MC are placeable on each of the carts 12 and 13. Alternatively, the pallet P and the tools T to be delivered into and out of two or more of the production facilities MC may be placed on each of the carts 12 and 13.

Referring to FIG. 1, the workpieces W prepared in the workpiece set-up area 2b are conveyed to one of the production facilities MC by the first operator A1 using the cart 13, and the workpieces W prepared in the workpiece set-up area 2b are conveyed to another one of the production facilities MC by the first operator A2 using the cart 12. The workpieces W that have finished undergoing production processes through the production facilities MC are conveyed from the production facilities MC to the workpiece set-up area 2b by the first operator A1 who uses the cart 13 and the first operator A2 who uses the cart 12. The first operators A1 and A2 also perform activating operations to activate the production facilities MC. The first operators A1 and A2 deliver the workpieces W into the production facilities MC and then activate the production facilities MC. This causes the production facilities MC to perform production processes on the workpieces W.

When necessary, the tools T stored in the tool set-up area 2c are conveyed to the production facilities MC by the first operator A1 who uses the cart 13 and the first operator A2 who uses the cart 12. When necessary, the tools T attached to the production facilities MC are conveyed to the tool set-up area 2c by the first operator A1 who uses the cart 13 and the first operator A2 who uses the cart 12. Each of the production facilities MC is thus not a fully-automated facility that does not require involvement of an operator at all but is a non-fully-automated facility that requires involvement of an operator.

One or more of the production facilities MC may be apparatus(es) included in a production line, for example. In one example, the production facility MC1 and the production facility MC2 may be respectively in charge of a first step and a second step of a production process, and the workpieces W may be automatically conveyed from the production facility MC1 to the production facility MC2. Also in such a case, the first operators A1 and A2 each deliver the workpieces W into and out of an associated one of the production facilities MC1 and MC2, so that the production facilities MC1 and MC2 start the production process.

As illustrated in FIG. 1, the workpiece set-up area 2b is located adjacent to the facility area 2a. In one example, the workpiece set-up area 2b is located adjacent to the opening defined by the production facilities MC arranged in a U shape. In the present embodiment, the workpiece set-up area 2b is thus located close to the input-output device 11 that provides the first operation instruction.

One or more operators B are present in the workpiece set-up area 2b. The second operator(s) B perform(s) a second operation in accordance with details of a second operation instruction provided from an input-output device 21. The second operation includes a workpiece securing operation and a correction amount measuring operation. The second operator(s) B perform(s) the workpiece securing operation involving securing not-yet-machined workpieces W to the pallet P on a work table 22 in the workpiece set-up area 2b, as illustrated in FIG. 3. With the not-yet-machined workpieces W secured to the pallet P, the second operator(s) B perform(s) the correction amount measuring operation involving measuring the amount of correction of the secured position of each workpiece W with respect to a reference position Pa on the pallet P using a measuring device 23, such as a camera or a touch sensor.

The second operation further includes an information writing operation. Using an information writer 24 illustrated in FIG. 1, the second operator(s) B perform(s) the information writing operation involving writing information (such as the type of each workpiece W and the amount of correction of the secured position of each workpiece W measured by the measuring device 23) on ID tags Tag (illustrated in FIGS. 1 and 3) assigned to the pallets P to which the workpieces W are secured. Each ID tag Tag is an identification code, such as an RF tag, a two-dimensional code, or a bar code.

The second operation further includes a pallet moving operation. As illustrated in FIG. 1, the second operator(s) B perform(s) the pallet moving operation involving moving the pallets P from the work table 22 to a cabinet 25 after the preceding operations have been finished. The workpiece set-up area 2b also serves as an area where the second operator(s) B receive(s) the workpieces W delivered out of the production facilities MC by the first operators A1 and A2.

The tool set-up area 2c is an area where the first operators A1 and A2 perform set-up operations for the tools T. Alternatively, the set-up operations for the tools T may be performed by the second operator(s) B or other operator(s) instead of the first operators A1 and A2. A tool setter 31, a shared tool storage 32, and a permanent tool temporary storage 33 are disposed in the tool set-up area 2c.

Figure 4:
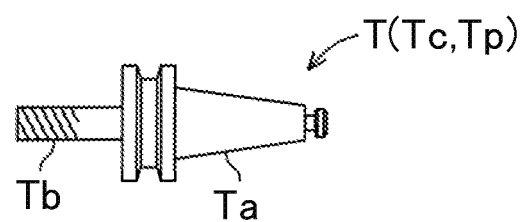
FIG. 4 is a diagram illustrating a tool T.

As illustrated in FIG. 4, each tool T includes a tool holder Ta and a cutter Tb fixed to the tool holder Ta. The tool holder Ta may be used on a shared basis, so that only the cutter Tb may be replaceable. In one example, the cutter Tb that has reached the end of its life is removed from the tool holder Ta, and a new cutter Tb is attached to the tool holder Ta.

The tool setter 31 is a device to remove the cutter Tb from the tool holder Ta and attach the cutter Tb to the tool holder Ta as mentioned above. The tool setter 31 measures the length of protrusion of the cutter Tb from the tool holder Ta. The tool setter 31 is able to register information unique to each tool T, such as the type of each cutter Tb, the outer diameter of each cutter Tb, and the length of protrusion of each cutter Tb measured. Examples of information indicative of the type of each cutter Tb include on an end mill, a tap, a milling cutter, and a turning tool.

As illustrated in FIG. 1, the shared tool storage 32 stores a plurality of shared tools Tc included in the tools T. Each shared tool Tc is the tool T for shared use among the production facilities MC. Examples of the shared tools Tc include an infrequently used tool and an expensive tool. The permanent tool temporary storage 33 stores a plurality of permanent tools Tp. The permanent tools Tp are the tools T other than the shared tools Tc. Each permanent tool Tp is the tool T solely holdable by an associated one of the production facilities MC. At normal times, the permanent tools Tp are each stored in an associated one of the production facilities MC. The permanent tool Tp including the cutter Tb that has reached the end of its life and thus needs replacement will be stored in the permanent tool temporary storage 33.

The manager C is present in the management area 3. The management area 3 is a control area where the manager C controls each device in the production area 2. A control server 41, an input-output device 42 for the manager C, and a management display 43 are disposed in the management area 3. The control server 41 is connected to each device in the production area 2 so as to communicate various information. The control server 41 is not limited to a server disposed in the management area 3 but may be a cloud server. The manager C uses the input-output device 42 so as to enter data to the control server 41, present data on a display screen, and output information to external device(s).

The management display 43 is a display to present information stored in the control server 41. The management display 43 includes a screen of a size that allows visual recognition from a location far away from the management display 43. The management display 43 presents the information stored in the control server 41, such as operating status information on each of the production facilities MC, operation statuses of the first operators A1 and A2, a production plan, and an actual production. The manager C grasps a production status while checking the details of the information presented on the management display 43, so as to take appropriate measures.

Figure 5:
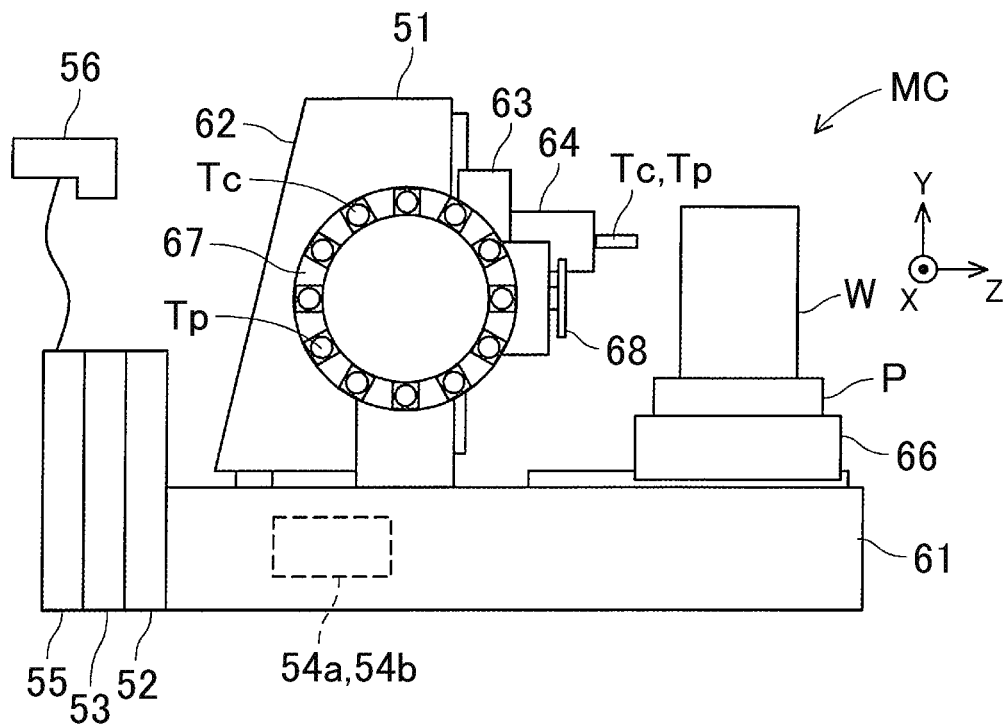
FIG. 5 is a diagram illustrating a machine configuration of a production facility MC.
Figure 6:
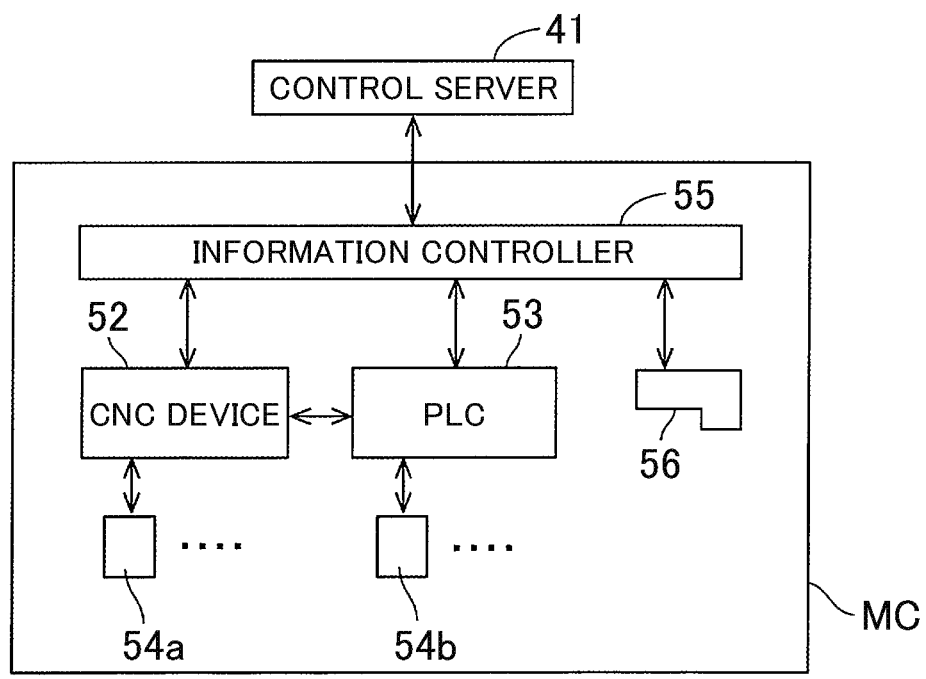
FIG. 6 is a functional block diagram of the production facility MC.

The configuration of each production facility MC will be described in detail with reference to FIGS. 5 and 6. Each production facility MC is a machining center by way of example. The machining center that serves as the production facility MC includes the tools T, a facility body 51, a computerized numerical control (CNC) device 52, a programmable logic controller (PLC) 53, a status detector 54a, a status detector 54b, an information controller 55, and an ID detector 56. Using the tools T, the facility body 51 processes the workpieces W delivered thereto.

The facility body 51 is configured as described below. A bed 61 is fixed to an installation surface. The bed 61 supports a column 62 such that the column 62 is movable in an X-axis direction (i.e., a direction perpendicular to the plane of FIG. 5). The front surface of the column 62 (i.e., the right surface of the column 62 in FIG. 5) supports a saddle 63 such that the saddle 63 is movable in a Y-axis direction (i.e., the up-down direction in FIG. 5). The saddle 63 is provided with a spindle device 64. The spindle device 64 includes a spindle (not illustrated) that is a rotator. The spindle retains one of the tools T (e.g., the shared tool Tc or the permanent tool Tp) in a replaceable manner.

A table 66 is supported on a portion of the bed 61 located opposite to the column 62 in a Z-axis direction (i.e., the right-left direction in FIG. 5), such that the table 66 is movable in the Z-axis direction. The pallet P is fixed onto the table 66. One or more workpieces W are fixed onto the pallet P. A tool magazine 67 is disposed above a portion of the bed 61 located laterally of the column 62. The tool magazine 67 holds the tools T (such as the shared tools Tc and the permanent tools Tp). The facility body 51 is further provided with a tool changer 68. The tool changer 68 replaces the tool T retained by the spindle device 64 with one of the tools T held in the tool magazine 67 and having a specified tool number.

In accordance with an NC program, the CNC device 52 controls a motor (not illustrated) to rotate the spindle of the spindle device 64 and controls a motor (not illustrated) to move the workpiece W relative to the tool T attached to the spindle device 64. The CNC device 52 acquires information detected by the status detector 54a that detects the status of the production facility MC, and controls the motors in accordance with the information acquired. The status detector 54a detects driving information on driving devices, such as the motors. Examples of the status detector 54a include: a detector to detect a driving current flowing through the motor for the spindle device 64; a detector to detect driving current(s) flowing through the motor(s) to move the column 62, the saddle 63, and the table 66; and a detector to detect an X-axis position of the column 62, a Y-axis position of the saddle 63, and a Z-axis position of the table 66.

The PLC 53 performs sequence control in accordance with a ladder circuit and/or a sequential function chart (SFC) while operating in cooperation with the CNC device 52. The PLC 53 acquires information detected by the status detector 54*b* that detects the status of the production facility MC. Examples of the information detected by the status detector 54*b* include an ON/OFF status of the production facility MC. In one example, the PLC 53 controls operation(s) to move the tool T having a specified tool number to a replacement position on the tool changer 68, and controls operation(s) of the tool changer 68. The PLC 53 controls a pump of a coolant device (not illustrated) so as to control supply of a coolant.

The information controller 55 is connected through, for example, Ethernet (registered trademark) or EtherCAT (registered trademark) to the CNC device 52 and the PLC 53 inside the production facility MC. The information controller 55 is connected through, for example, Ethernet (registered trademark) or EtherCAT (registered trademark) to the control server 41 disposed in the management area 3. If the control server 41 is a cloud server, the information controller 55 is connected to the control server 41 through the Internet, for example.

The information controller 55 acquires the information acquired by the CNC device 52 and the PLC 53 and information generated by the CNC device 52 and the PLC 53. The information controller 55 transmits the acquired information to the control server 41 on an as-is basis, or edits or analyzes the acquired information so as to transmit the resulting information to the control server 41. The information controller 55 receives information from the control server 41 and transfers the received information to the CNC device 52 and the PLC 53.

In other words, the information controller 55 functions as an intermediary for information reception and transmission between the CNC device 52 and the control server 41 and between the PLC 53 and the control server 41. If the information controller 55 transmits all of the information, acquired from the CNC device 52 and the PLC 53, to the control server 41, information communication traffic on a network will be enormous. The information controller 55 thus edits or analyzes the information when necessary. In one example, the information controller 55 performs an editing process or an analyzing process that involves, for example, determining a malfunction in the production facility MC and/or determining an abnormal machining accuracy for the workpiece W.

The ID detector 56 is a device to be operated by the first operator A1 or A2. When the first operator A1 or A2 delivers the workpiece(s) W into the production facility MC, the ID detector 56 recognizes the ID tag Tag assigned to the pallet P to which the workpiece(s) W is/are secured and thus reads the information of the ID tag Tag. As previously described, the second operator B writes information on the ID tag Tag in the workpiece set-up area 2*b*. Although the ID detector 56 is described on the assumption that the ID detector 56 is to be operated by the first operator A1 or A2, the ID detector 56 may automatically read the information of the ID tag Tag without being operated by the first operator A1 or A2. The ID detector 56 may automatically read the information of the ID tag Tag when the first operator A1 or A2 delivers the workpiece(s) W into the production facility MC.

Figure 7:
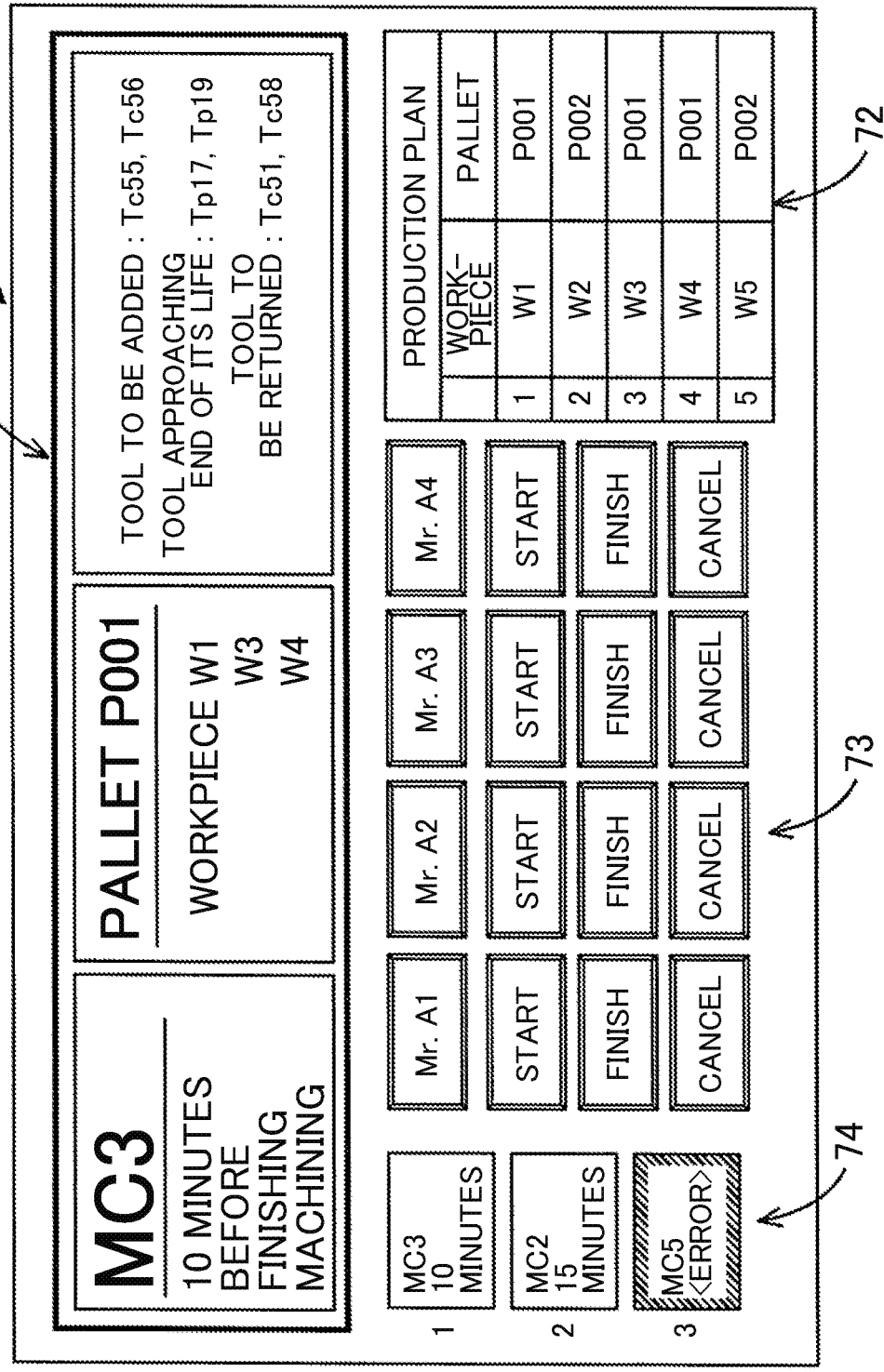
FIG. 7 illustrates a screen of an input-output device 11 to provide a first operation instruction to a first operator A1 or A2.

The input-output device 11 includes an instruction screen to provide the first operation instruction to each of the first operators A1 and A2. The instruction screen of the input-output device 11 will be described with reference to FIG. 7. Although the present embodiment is described on the assumption that the number of first operators is two, the number of first operators may be three or more. In such a case, the first operation instruction is provided to each of the three or more first operators. As illustrated in FIG. 7, the instruction screen of the input-output device 11 includes an operation display section 71, a production plan section 72, an input section 73, and a facility status section 74. The operation display section 71 presents the next first operation or the current first operation. The production plan section 72 presents the workpieces W and the pallets P listed in a sequential order specified by the production plan. The input section 73 presents operator name buttons, first operation start buttons, first operation finish buttons, and first operation cancel buttons. Each of the first operation start buttons, finish buttons, and cancel buttons is provided for an associated one of the first operators. The facility status section 74 presents the status of each production facility MC.

The operation display section 71 presents the production facility MC that is an operation target, the time required for the production facility MC to finish the current process, and the details of the first operation to be performed by the first operator A1 or A2. In the example illustrated in FIG. 7, the production facility MC that is the operation target is the production facility MC3. Ten minutes are left for the production facility MC3 to finish machining. This means that it is ideal for the first operator A1 or A2 to perform the next first operation within 10 minutes.

The first operation instruction presented on the instruction screen of FIG. 7 and provided to the first operator A1 or A2 includes information indicating that a pallet P001 is to be conveyed to the production facility MC3. This means that the first operator A1 or A2 needs to convey the pallet P001 prepared in the workpiece set-up area 2*b* to the production facility MC3. The instruction screen also presents information indicating that workpieces W1, W3, and W4 are to be secured to the pallet P001.

The first operation instruction presented on the instruction screen of FIG. 7 and provided to the first operator A1 or A2 includes information indicating that a shared tool Tc55 and a shared tool Tc56 are to be added to the production facility MC3. In other words, the first operator A1 or A2 needs to convey the shared tool Tc55 and the shared tool Tc56 from the shared tool storage 32 to the production facility MC3.

The first operation instruction presented on the instruction screen of FIG. 7 and provided to the first operator A1 or A2 includes information indicating that a permanent tool Tp17 and a permanent tool Tp19 attached to the production facility MC3 are to be replaced with new ones. This means that the permanent tools Tp17 and Tp19 currently attached to the production facility MC3 are reaching the end of their life. In other words, the first operator A1 or A2 needs to convey the new permanent tools Tp17 and Tp19 from the permanent tool temporary storage 33 to the production facility MC3 so as to replace the permanent tools Tp17 and Tp19 currently attached to the production facility MC3 with the new permanent tools Tp17 and Tp19.

The first operation instruction presented on the instruction screen of FIG. 7 and provided to the first operator A1 or A2 includes information indicating that a shared tool Tc51 and a shared tool Tc58 attached to the production facility MC3 are to be returned to the shared tool storage 32. In other words, the first operator A1 or A2 needs to convey the shared tools Tc51 and Tc58 from the production facility MC3 to the shared tool storage 32.

The production plan section 72 indicates the workpieces W listed in the order specified by the production plan, and the numbers of the pallets P to which the workpieces W are to be secured. This means that the workpieces W1, W3, and W4 are to be secured to the pallet P001, and workpieces W2 and W5 are to be secured to a pallet P002.

The input section 73 presents the buttons to be operated by the first operators A1 and A2. The following description is based on the assumption that the first operator A1 performs an operation on the input section 73. When the first operator A1 starts the next first operation, the first operator A1 touches the operator name button "Mr. A1". In response to this, the operation display section 71 presents the next first operation. The first operator A1 subsequently touches the start button so as to start the next first operation in accordance with the instruction provided.

When the first operator A1 finishes the current operation, the first operator A1 touches the operator name button "Mr. A1". In response to this, the operation display section 71 presents the first operation being performed currently. The first operator A1 is thus able to check the currently performed first operation by looking at the operation display section 71. The first operator A1 subsequently touches the finish button so as to completely finish the currently performed first operation.

The facility status section 74 lists the names of the production facilities MC in the order in which the time to be taken to finish machining is short. The facility status section 74 presents the time to be taken to finish machining for each of the production facilities MC. In the event of a malfunction in any of the production facilities MC, the facility status section 74 presents the malfunctioning production facility MC.

Figure 8:
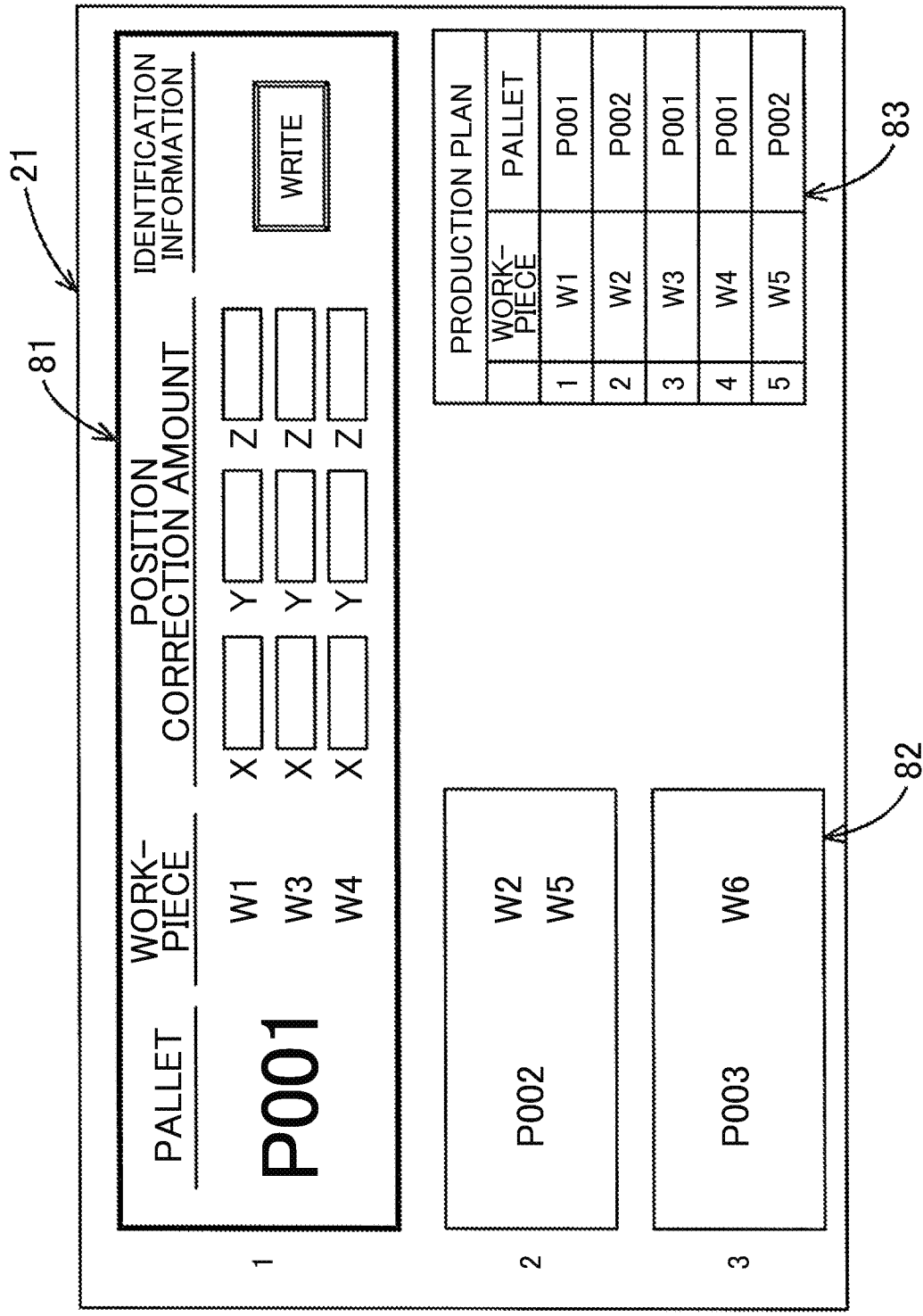
FIG. 8 illustrates a screen of an input-output device 21 to provide a second operation instruction to a second operator B.

The input-output device 21 includes an instruction screen to provide the second operation instruction to the second operator B. The instruction screen of the input-output device 21 will be described with reference to FIG. 8. As illustrated in FIG. 8, the instruction screen of the input-output device 21 includes an initial operation display section 81, a subsequent operation display section 82, and a production plan section 83. The initial operation display section 81 presents the next second operation or the current second operation. The subsequent operation display section 82 presents the second operations to be performed after the second operation presented in the initial operation display section 81. The production plan section 83 presents the workpieces W and the pallets P listed in a sequential order specified by the production plan.

The initial operation display section 81 presents the number of the operation target pallet P, the numbers of the target workpieces W to be secured to the pallet P, entry fields for the amount of correction (X, Y, Z) of the secured position of each target workpiece W, and a write button for identification information. The amount of correction of the secured position of each target workpiece W is measured by the measuring device 23, and the measured value is automatically entered. After the amount of correction of the secured position is entered for all of the target workpieces W, the second operator B brings the information writer 24 close to the ID tag Tag of the pallet P and then touches the write button. This writes information, such as the amount of correction of the secured position, on the ID tag Tag. The touch on the write button by the second operator B finishes the second operation taken on by the second operator B.

The production plan section 83 indicates the workpieces W listed in the order specified by the production plan, and the numbers of the pallets P to which the workpieces W are to be secured. This means that the workpieces W1, W3, and W4 are to be secured to the pallet P001, and the workpieces W2 and W5 are to be secured to the pallet P002.

Figure 9:
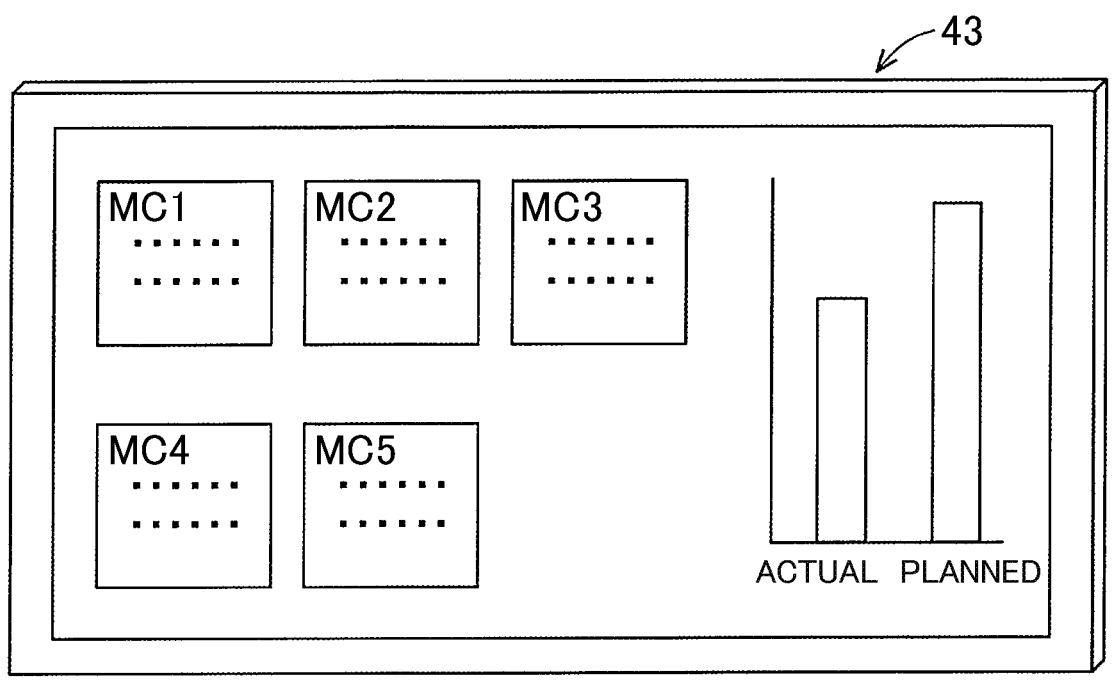
FIG. 9 illustrates a screen of a management display 43 in a management area 3.

As illustrated in FIG. 9, the left section of the management display 43 presents operating status information on each of the production facilities MC, such as (a) information indicating whether each production facility MC is functioning properly or malfunctioning and (b) information indicating whether each production facility MC is operating or non-operating. When any one of the production facilities MC is carrying out a production process, the left section of the management display 43 presents: (c) the workpiece(s) W subjected to the production process; (d) the amount of correction of the secured position(s) of the workpiece(s) W; (e) an NC program being executed; (f) an operation status of the first operator A1 or A2, such as the time at which the execution of the NC program has been activated by the first operator A1 or A2; (g) the time at which the production process is to be finished; and (h) the name and operation capability of the first operator A1 or A2 who has delivered the workpiece(s) W into the production facility MC. When the first operator A1 or A2 is making preparations for delivery of the workpiece(s) W into the production facility MC, the left section of the management display 43 presents: (i) an operation status of the first operator A1 or A2, such as information indicating that the delivery of the workpiece(s) W into the production facility MC is in preparation; and (j) an operation status of the first operator A1 or A2, such as the time at which the first operation starts.

The right section of the management display 43 presents the production plan and the actual production such that a comparison is made therebetween. The comparison between the production plan and the actual production makes it possible to grasp whether there is a delay in the actual production relative to the production plan.

The configuration of the production management system 1 divided into areas has been described above with reference to FIG. 1. The production management system 1 includes the production facilities MC, the input-output device 11 to provide the first operation instruction, the input-output device 21 to provide the second operation instruction, the measuring device 23, the information writer 24, the tool setter 31, the control server 41, the input-output device 42 for the manager C, and the management display 43. The production facilities MC and the input-output device 11 are disposed in the facility area 2a. The input-output device 21, the measuring device 23, and the information writer 24 are disposed in the workpiece set-up area 2b. The tool setter 31 is disposed in the tool set-up area 2c. The control server 41, the input-output device 42, and the management display 43 are disposed in the management area 3.

Figure 10:
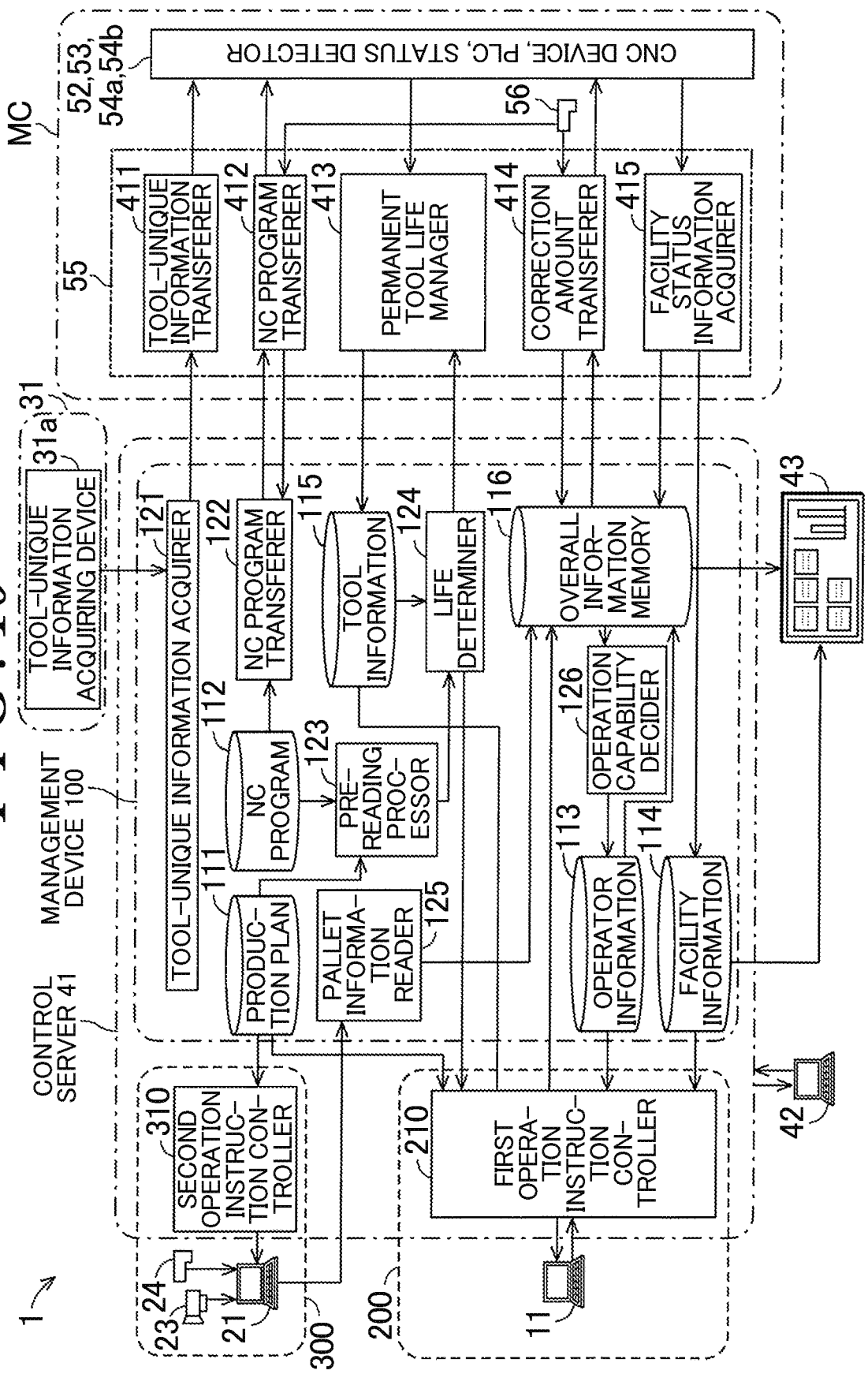
FIG. 10 is a functional block diagram of the production management system 1.
Figure 11A:
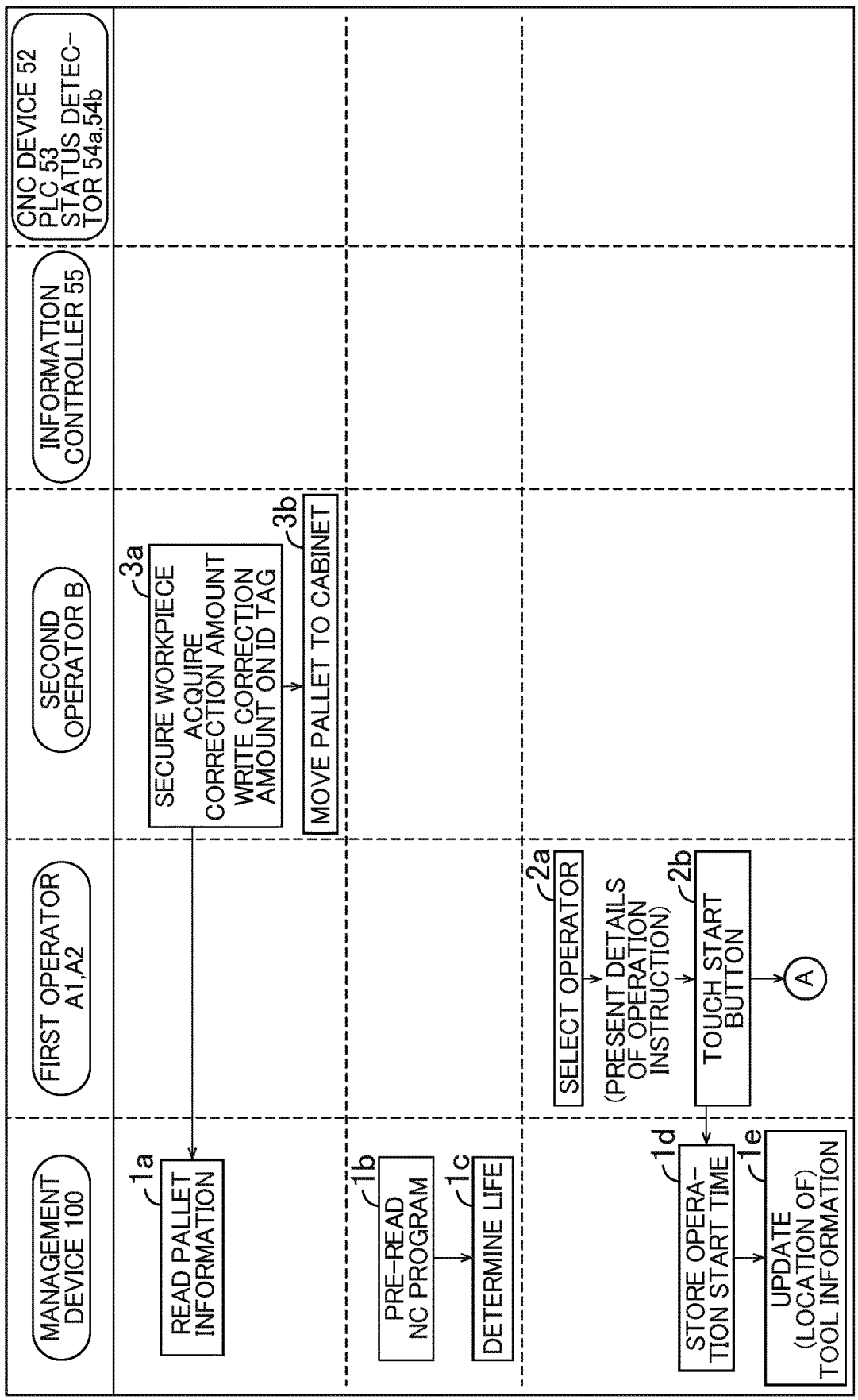
FIG. 11A is a flow chart illustrating processing operations to be performed by the production management system 1.
Figure 11B:
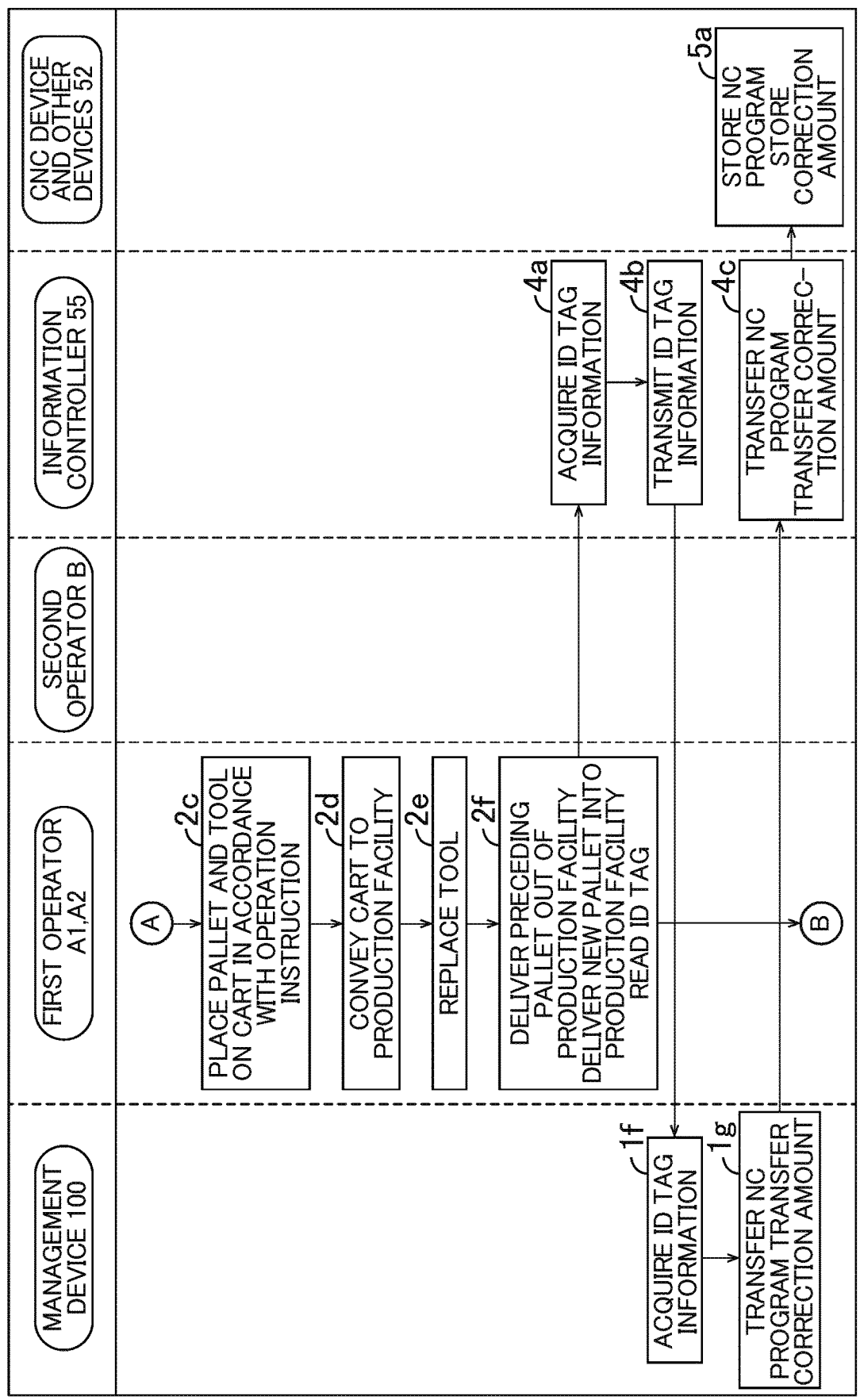
FIG. 11B is a flow chart illustrating processing operations to be performed by the production management system 1.
Figure 11C:
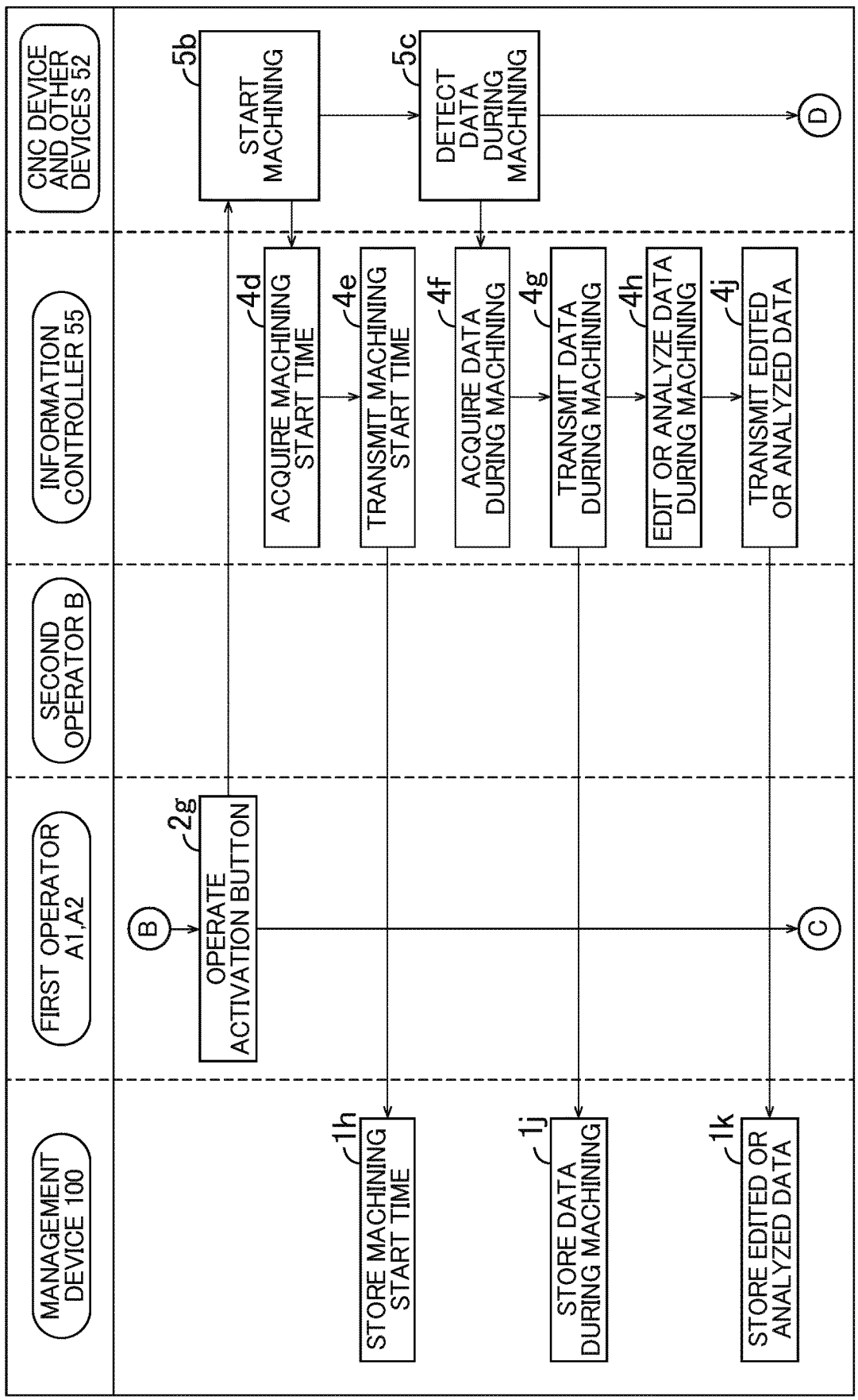
FIG. 11C is a flow chart illustrating processing operations to be performed by the production management system 1.
Figure 11D:
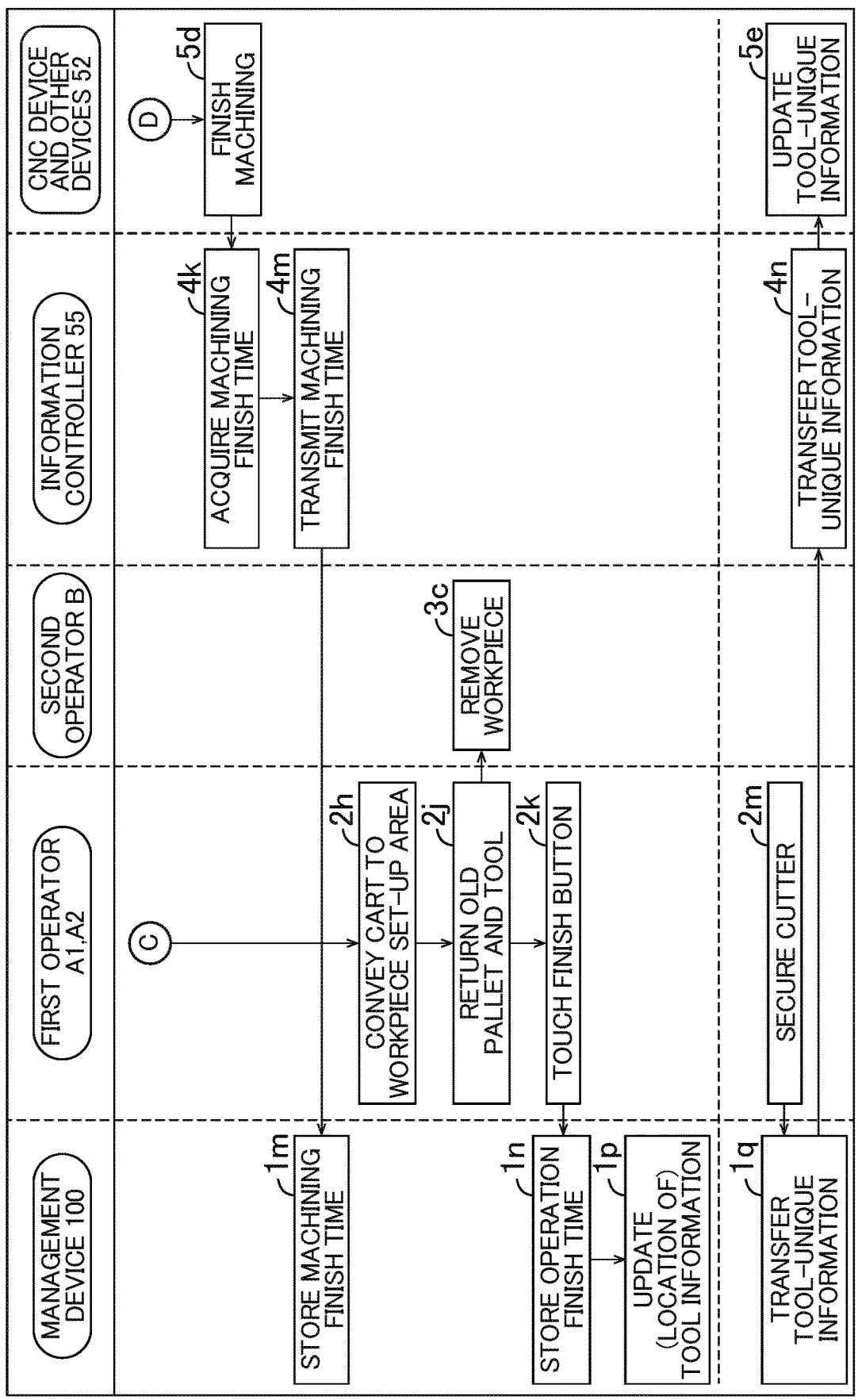
FIG. 11D is a flow chart illustrating processing operations to be performed by the production management system 1.

The functions of the production management system 1 will be described in detail below. The following description focuses on the functions of the control server 41 and the information controller 55 with reference to FIG. 10. The production management system 1 includes the production facilities MC, a management device 100, a first operation instruction provider 200, a second operation instruction provider 300, the tool setter 31, the input-output device 42 for the manager C, and the management display 43.

The management device 100 is provided by a portion of the control server 41. The first operation instruction provider 200 is provided by another portion of the control server 41 and the first operation instruction input-output device 11. The second operation instruction provider 300 is provided by the remaining portion of the control server 41, the second operation instruction input-output device 21, the measuring device 23, and the information writer 24.

The management device 100 includes a memory 111 storing the production plan. The production plan includes the time at which the production process for the workpieces W is to be finished, the order in which the workpieces W are to be subjected to the production process, and information of the pallets P to which the workpieces W are to be secured. The management device 100 further includes a memory 112 storing NC programs to control the facility body 51.

The management device 100 further includes a memory 113 storing operator information. The operator information includes the operation capability of each of the first operators A1 and A2, and operation status information on each of the first operators A1 and A2. The operation capability includes the type of operation each of the first operators A1 and A2 is able to perform, an average operation speed for each type of operation, an operation speed for each type of operation, and an operation level concerning operation quality. The operation status information includes information on a target operation specified by an input to the first operation instruction input-output device 11 by the first operator A1 or A2. Examples of this information include information on the operation target workpieces W and pallets P, the operation start time and operation finish time specified by the input, and the time at which the production facility MC is activated.

The management device 100 further includes a memory 114 storing facility information. The facility information includes the type of each production facility MC, and operating status information on each production facility MC. The operating status information includes information indicating whether each production facility MC is functioning properly or malfunctioning, and information indicating whether each production facility MC is operating or non-operating. The memory 114 stores the operating status information acquired by a facility status information acquirer 415 of the information controller 55.

The management device 100 further includes a memory 115 storing tool information. The tool information includes: information on the shared tools Tc and the permanent tools Tp; information on the permanent tools Tp currently attached to the production facilities MC; the location of each shared tool Tc; a duration of use of each tool T up to the present time; and the time at which each tool T will reach the end of its life.

The management device 100 further includes an overall information memory 116 storing overall information. The overall information memory 116 stores the operating status information acquired by the facility status information acquirer 415 of the information controller 55. Specifically, the overall information memory 116 stores the operating status information on each of the production facilities MC, such as (a) information indicating whether each production facility MC is functioning properly or malfunctioning and (b) information indicating whether each production facility MC is operating or non-operating.

When any one of the production facilities MC is carrying out a production process, the overall information memory 116 stores: (c) the workpiece(s) W subjected to the production process; (d) the amount of correction of the secured position(s) of the workpiece(s) W; (e) an NC program being executed; (f) an operation status of the first operator A1 or A2, such as the time at which the execution of the NC program has been activated by the first operator A1 or A2; (g) the time at which the production process is to be finished; and (h) the name and operation capability of the first operator A1 or A2 who has delivered the workpiece(s) W into the production facility MC.

When the first operator A1 or A2 is making preparations for delivery of the workpiece(s) W into the production facility MC, the overall information memory 116 stores: (i) an operation status of the first operator A1 or A2, such as information indicating that the delivery of the workpiece(s) W into the production facility MC is in preparation; and (j) an operation status of the first operator A1 or A2, such as the time at which the first operation starts. The overall information memory 116 further stores (k) information on the production plan and the actual production. These pieces of information are stored in association with each other in the overall information memory 116.

The information stored in the overall information memory 116 is transmitted to the management display 43. The overall information memory 116 determines whether the overall information memory 116 has received information of the pallet P from a correction amount transferer 414 of the information controller 55. Upon determining that the overall information memory 116 has received the information of the pallet P, the overall information memory 116 recognizes this information as a correction amount transfer request. In response to this request, a correction amount associated with the workpiece W secured to the pallet P is transmitted to the correction amount transferer 414.

The management device 100 further includes a tool-unique information acquirer 121. The tool setter 31 includes a tool-unique information acquiring device 31a. The tool-unique information acquirer 121 acquires, from the tool-unique information acquiring device 31a, information that is unique to the tools T and acquired by the tool-unique information acquiring device 31a. The information unique to the tools T includes the type of the cutter Tb, the outer diameter of the cutter Tb, and the length of protrusion of the cutter Tb. The tool-unique information acquirer 121 transmits the acquired information unique to the tools T to a tool-unique information transferer 411 of the information controller 55.

The management device 100 further includes an NC program transferer 122. The NC program transferer 122 determines whether information of the pallet P delivered into the production facility MC has been received from an NC program transferer 412 of the information controller 55. Upon determining that the NC program transferer 122 has received the information of the pallet P, the NC program transferer 122 recognizes this information as an NC program transfer request, and acquires, from the memory 112 storing NC programs, the NC program associated with the workpiece W secured to the pallet P. The NC program transferer 122 then transmits the NC program, acquired from the memory 112, to the NC program transferer 412 of the information controller 55.

The management device 100 further includes a pre-reading processor 123. The pre-reading processor 123 determines the tools T to be used to process the next workpiece(s) W in accordance with the production plan and NC program. The pre-reading processor 123 calculates, in accordance with the NC program, a duration of time during which the tools T are to be used to process the next workpiece(s).

The management device 100 further includes a life determiner 124. In accordance with the tool information stored in the memory 115 and the duration of use of the tools T calculated by the pre-reading processor 123, the life determiner 124 determines whether the tools T attached to the production facility MC, into and out of which the workpiece(s) W is/are to delivered, include any tool T expected to reach the end of its life during processing of the next workpiece(s) W. When the tools T attached to the production facility MC include any such tool T, the life determiner 124 regards this tool T as a replacement target tool expected to shortly reach the end of its life, and causes the first operation instruction provider 200 to provide an instruction to replace the replacement target tool.

The management device 100 further includes a pallet information reader 125. The pallet information reader 125 reads the information that has been written on the ID tag Tag by the second operator B using the information writer 24. The information read by the pallet information reader 125 is stored in the overall information memory 116.

The management device 100 further includes an operation capability decider 126. The operation capability decider 126 acquires information that is included in the information stored in the overall information memory 116 and is to be used to decide operation capability. In accordance with the information acquired, the operation capability decider 126 decides the operation capability of each of the first operators A1 and A2. In one example, the operation capability decider 126 calculates the time required for a predetermined first operation from the operation start time and operation finish time. When the time required is shorter than an upper-level reference time set in advance, the operation capability decider 126 raises the level of operation capability. When the time required is longer than a current-level reference time, the operation capability decider 126 lowers the level of operation capability. The operation capability of each of the first operators A1 and A2, decided by the operation capability decider 126, is stored in the memory 113 storing the operator information.

The first operation instruction provider 200 includes a first operation instruction controller 210 and the input-output device 11. The first operation instruction controller 210 acquires the production plan stored in the memory 111, the operator information stored in the memory 113, and the facility information stored in the memory 114. In accordance with the production plan and the operating statuses of the production facilities MC, the first operation instruction controller 210 presents these pieces of information on the input-output device 11 in order to give the first operator A1 or A2 an instruction to deliver the workpiece(s) W into and out of a predetermined one of the production facilities MC. The delivery of the workpiece(s) W is included in the first operation. In accordance with the production plan and the shared tool(s) Tc attached to each target production facility MC, the first operation instruction controller 210 decides the shared tool(s) Tc to be added and the shared tool(s) Tc to be returned. The first operation instruction controller 210 presents information on the shared tool(s) Tc on the input-output device 11 in order to give the first operator A1 or A2 an instruction to perform a tool replacing operation for addition and return of the shared tool(s) Tc. The tool replacing operation is included in the first operation.

In accordance with the result of the determination made by the life determiner 124, the first operation instruction controller 210 determines whether any one of the permanent tools Tp attached to the target production facility MC is a replacement target tool expected to shortly reach the end of its life. When there is any replacement target tool expected to shortly reach the end of its life, the first operation instruction controller 210 presents information on the replacement target tool on the input-output device 11 in order to give the first operator A1 or A2 an instruction to perform the tool replacing operation included in the first operation.

The first operation instruction controller 210 acquires information input to the input-output device 11 by the first operator A1 or A2. The information acquired by the first operation instruction controller 210 is stored in the overall information memory 116. In one example, when the operation start button or operation finish button has been touched by the first operator A1 or A2, information indicative of this fact and the time at which the operation start button or operation finish button has been touched are stored in the overall information memory 116 by the first operation instruction controller 210.

When the input-output device 11 has provided an instruction to perform an operation involving addition and return of the shared tool(s) Tc, a touch on the operation start button by the first operator A1 or A2 prompts the first operation instruction controller 210 to update the location(s) of the shared tool(s) Tc stored in the memory 115.

The second operation instruction provider 300 includes a second operation instruction controller 310, the input-output device 21, the measuring device 23, and the information writer 24. In accordance with the production plan stored in the memory 111, the second operation instruction controller 310 presents information indicative of the details of the second operation on the input-output device 21 in order to give the second operator B an instruction to perform an operation involving securing the workpiece(s) W to the pallet P and an operation involving acquiring the amount of correction of the secured position(s) of the workpiece(s) W using the measuring device 23. These operations are included in the second operation.

The information controller 55 included in each of the production facilities MC includes the tool-unique information transferer 411, the NC program transferer 412, a permanent tool life manager 413, the correction amount transferer 414, and the facility status information acquirer 415.

The information unique to the tools T and acquired by the tool-unique information acquirer 121 is transferred to the CNC device 52 by the tool-unique information transferer 411. The NC program transferer 412 acquires information of the pallet P that is included in the information written on the ID tag Tag and detected by the ID detector 56. The NC program transferer 412 transmits the information of the pallet P to the NC program transferer 122 of the management device 100. The NC program transferer 412 receives the NC program transmitted from the NC program transferer 122 of the management device 100. The NC program transferer 412 transmits the NC program to the CNC device 52.

In accordance with the information stored in the CNC device 52, the permanent tool life manager 413 exercises management of life of each permanent tool Tp attached to the production facility MC. Specifically, the permanent tool life manager 413 stores a duration of use of each permanent tool Tp between the start of use and the present time, and predicts a duration of use up to the time at which the end of life will be reached. The duration of use of each permanent tool Tp and the duration of use up to the time at which the end of life will be reached are transmitted to and stored in the memory 115 of the management device 100 by the permanent tool life manager 413. Upon determination by the life determiner 124 that any one of the permanent tools Tp is the replacement target tool expected to shortly reach the end of its life, this permanent tool Tp will be replaced. In this case, the permanent tool life manager 413 resets life management information on this permanent tool Tp.

The correction amount transferer 414 acquires information of the pallet P that is included in the information written on the ID tag Tag and is detected by the ID detector 56, and transmits the information of the pallet P to the overall information memory 116 of the management device 100. The correction amount transferer 414 receives the amount of correction of the secured position(s) of the workpiece(s) W transmitted from the overall information memory 116 of the management device 100, and transmits the amount of correction to the CNC device 52.

The facility status information acquirer 415 acquires various information from the CNC device 52, the PLC 53, and the status detectors 54a and 54b. The facility status information acquirer 415 transmits some of the acquired information to the overall information memory 116 and the memory 114 on an as-is basis. Examples of the information to be transmitted on an as-is basis include information indicating whether the production facility MC is operating or non-operating, the time at which an NC program is activated, the time at which the NC program ends, and information indicating whether the production facility MC is functioning properly or malfunctioning. The facility status information acquirer 415 edits or analyzes the other pieces of the acquired information instead of transmitting these pieces of information on an as-is basis, and transmits the edited information or the result of the analysis to the overall information memory 116 and the memory 114. In one example, driving information (e.g., driving current information) on driving devices, such as motors, is edited or analyzed so as to provide information indicative of a sign of a malfunction in the production facility MC.

Processing operations of the production management system 1 will be described below with reference to FIGS. 11A, 11B, 11C, and 11D. As illustrated in FIGS. 11A, 11B, 11C, and 11D, the processing operations of the production management system 1 related to each other are presented in a sequential order and classified into the following items: the management device 100; the first operator A1, A2; the second operator B; the information controller 55; and the CNC device 52, PLC 53 and status detector 54A, 54B.

First, processes for the second operation to be performed by the second operator B will be described. In step 3a, the second operator B secures the workpiece(s) W to the pallet P in accordance with an instruction provided from the second operation instruction provider 300. In step 3a, the second operator B then acquires the amount of correction of the secured position(s) of the workpiece(s) W using the measuring device 23. In step 3a, the second operator B subsequently writes the acquired correction amount on the ID tag Tag. In step 3b, the second operator B moves the pallet P to the cabinet 25 after the preceding processes have been finished. The writing of the correction amount on the ID tag Tag by the second operator B prompts the pallet information reader 125 of the management device 100 to read, in step 1a, the information written on the ID tag Tag on the pallet P.

Processes to be performed solely by the management device 100 independently of the first operators A1 and A2 and the second operator B will be described below. In step 1b, the pre-reading processor 123 of the management device 100 determines, in accordance with the production plan and the NC program, the tools T to be used to process the next workpiece(s) W, and calculates a duration of use of each tool T in accordance with the NC program. In step 1c, the life determiner 124 of the management device 100 determines whether any of the tools T attached to the production facility MC will reach the end of its life in accordance with the tool information stored in the memory 115 and the duration of use of each tool T calculated by the pre-reading processor 123. When there is any tool T that will reach the end of its life, the life determiner 124 stores information indicating that this tool T is regarded as a replacement target tool expected to shortly reach the end of its life. This enables the first operation instruction provider 200 to provide an instruction to replace the replacement target tool when the workpiece(s) W is/are delivered into the production facility MC by the first operator A1 or A2.

The following description discusses how the pallet P is conveyed by the first operator A1 or A2 during the first operation. In step 2a, the first operator A1 or A2 selects his or her operator name through the input-output device 11. The input-output device 11 then presents the details of the first operation for the first operator A1 or A2.

In step 2b, the first operator A1 or A2 touches the start button on the input-output device 11. In step 1d, the time at which the first operator A1 or A2 has started the first operation is stored in the overall information memory 116 of the management device 100. If the shared tool(s) Tc need(s) to be replaced, the first operation instruction controller 210 updates, in step 1e, the tool information on the location(s) of the shared tool(s) Tc stored in the memory 115 of the management device 100.

After the first operator A1 or A2 has touched the start button on the input-output device 11, the first operator A1 or A2 places the target pallet P on the cart 12 or 13 and places, when necessary, the tool(s) T on the cart 12 or 13 in step 2c in accordance with the details of the first operation instruction presented on the input-output device 11. In step 2d, the first operator A1 or A2 conveys the cart 12 or 13 to the target production facility MC. When necessary, the first operator A1 or A2 replaces, in step 2e, the tool(s) T attached to the production facility MC. In step 2f, the first operator A1 or A2 delivers the pallet P (i.e., a preceding pallet), to which the machined workpiece(s) W is/are secured, out of the production facility MC. In step 2f, the first operator A1 or A2 then delivers the pallet P (i.e., a new pallet), to which the not-yet-machined workpiece(s) W is/are secured, into the production facility MC. In step 2f, the first operator A1 or A2 reads, using the ID detector 56, information of the ID tag Tag assigned to the pallet P delivered into the production facility MC.

In step 4a, the NC program transferer 412 and the correction amount transferer 414 of the information controller 55 each acquire the information of the pallet P included in the information written on the ID tag Tag. In step 4b, the NC program transferer 412 and the correction amount transferer 414 of the information controller 55 respectively transmit the information of the pallet P acquired to the NC program transferer 122 and the overall information memory 116 of the management device 100.

In step 1f, the NC program transferer 122 and the overall information memory 116 of the management device 100 each acquire the information of the pallet P from the information controller 55. In step 1g, the NC program transferer 122 of the management device 100 acquires, from the memory 112 storing the NC programs, the NC program associated with the workpiece(s) W secured to the pallet P, and transmits the NC program to the NC program transferer 412 of the information controller 55. In step 1g, the overall information memory 116 of the management device 100 transmits, to the correction amount transferer 414 of the information controller 55, secured position correction amount(s) for the workpiece(s) W secured to the pallet P.

In step 4c, the NC program transferer 412 of the information controller 55 transmits the received NC program to the CNC device 52, and the correction amount transferer 414 of the information controller 55 transmits the received correction amount(s) to the CNC device 52. In step 5a, the CNC device 52 stores the NC program and the correction amount(s) received.

In step 2g, the first operator A1 or A2 operates the activation button of the production facility MC. In step 5b, the devices of the production facility MC, such as the CNC device 52, are activated so as to start machining the workpiece(s) W. In step 4d, the facility status information acquirer 415 of the information controller 55 acquires the time at which machining has started. In step 4e, the facility status information acquirer 415 transmits the acquired time to the memory 114 and the overall information memory 116 of the management device 100. In step 1h, the memory 114 and the overall information memory 116 of the management device 100 each store the time at which machining has started.

After the devices of the production facility MC, such as the CNC device 52, have been activated to start machining, the status detectors 54a and 54b detect data during machining in step 5c. In step 4f, the facility status information acquirer 415 of the information controller 55 acquires the data during machining from the CNC device 52 and the PLC 53. In step 4g, the facility status information acquirer 415 transmits some of the data during machining to the memory 114 and the overall information memory 116 of the management device 100 on an as-is basis. In step 1j, the memory 114 and the overall information memory 116 of the management device 100 each store the data during machining.

In step 4h, the facility status information acquirer 415 of the information controller 55 edits or analyzes the data during machining so as to generate edited or analyzed data. In step 4j, the facility status information acquirer 415 transmits the edited or analyzed data generated to the memory 114 and the overall information memory 116 of the management device 100. In step 1k, the memory 114 and the overall information memory 116 of the management device 100 each store the edited or analyzed data received.

When the production facility MC has finished machining the workpiece(s) W, the devices of the production facility MC, such as the CNC device 52, are deactivated in step 5d. In step 4k, the facility status information acquirer 415 of the information controller 55 acquires the time at which the production facility MC has finished machining the workpiece(s) W. In step 4m, the facility status information acquirer 415 transmits the acquired time to the memory 114 and the overall information memory 116 of the management device 100. In step 1m, the memory 114 and the overall information memory 116 of the management device 100 each store the time at which the production facility MC has finished machining the workpiece(s) W.

After having operated the activation button of the production facility MC, the first operator A1 or A2 conveys, in step 2h, the cart 12 or 13 to the workpiece set-up area 2b from a location near the production facility MC concurrently with the process being performed by the production facility MC. Specifically, the first operator A1 or A2 conveys the pallet P (i.e., the preceding pallet) to which the machined workpiece(s) W is/are secured, and conveys, when necessary, the tool(s) T detached from the production facility MC. In step 2j, the first operator A1 or A2 returns the pallet P (i.e., the preceding pallet), to which the machined workpiece(s) W is/are secured, to the work table 22 in the workpiece set-up area 2b, and returns, when necessary, the tool(s) T to the shared tool storage 32 or the permanent tool temporary storage 33. In step 3c, the second operator B removes the machined workpiece(s) W from the pallet P returned.

In step 2k, the first operator A1 or A2 touches the finish button on the input-output device 11. In step 1n, information indicating that the first operator A1 or A2 has finished the first operation is stored in the overall information memory 116 of the management device 100. If the shared tool(s) Tc need(s) to be replaced, the first operation instruction controller 210 updates, in step 1p, the tool information on the location(s) of the shared tool(s) Tc stored in the memory 115 of the management device 100.

Processes to be performed by the first operator A1 or A2 using the tool setter 31 will be described below. In step 2m, the first operator A1 or A2 secures the cutter Tb to the tool holder Ta using the tool setter 31. Although not illustrated, the tool-unique information acquiring device 31a of the tool setter 31 then acquires information unique to the tool T. In step 1q, the tool-unique information acquirer 121 of the management device 100 transfers, to the tool-unique information transferer 411 of the information controller 55, the information unique to the tool T and acquired by the tool-unique information acquiring device 31a of the tool setter 31. In step 4n, the tool-unique information transferer 411 of the information controller 55 transfers the information unique to the tool T to, for example, the CNC device 52. In step 5e, the CNC device 52, for example, updates the information unique to the tool T.

In accordance with the status of delivery of the workpiece(s) W into and out of the production facilities MC, the management device 100 transmits process data (e.g., the NC program and position correction amount) for activation of the production facility MC to the production facility MC into which the workpiece(s) W has/have been delivered by the first operator A1 or A2. Accordingly, the process of transmitting the process data (e.g., the NC program and position correction amount) is automatically performed by the management device 100 in conjunction with the first operation performed by the first operator A1 or A2. This consequently enhances the efficiency of the operation performed by the first operator A1 or A2.

Specifically, when the ID detector 56 has detected delivery of the workpiece(s) W into the production facility MC, the management device 100 transmits the NC program, included in the process data and associated with the workpiece(s) W, to the production facility MC. Thus, no erroneous NC program is transmitted to the production facility MC, and the NC program is timely transmitted to the production facility MC. Consequently, operation efficiency and operation quality will be higher than when the first operator A1 or A2 registers the NC program.

When the ID detector 56 has detected delivery of the workpiece(s) W into the production facility MC, the management device 100 transmits the secured position correction amount, included in the process data and associated with the workpiece(s) W, to the production facility MC. Thus, no erroneous secured position correction amount is transmitted to the production facility MC, and the correction amount is timely transmitted to the production facility MC. Consequently, operation efficiency and operation quality will be higher than when the first operator A1 or A2 registers the secured position correction amount.

The second operator B acquires the amount of correction of the secured position(s) of the workpiece(s) W in response to an instruction provided from the second operation instruction provider 300. The first operator A1 or A2 who delivers the workpiece(s) W into the production facility MC is thus different from the second operator B who acquires the amount of correction of the secured position(s) of the workpiece(s) W. Accordingly, the production management system 1 prevents erroneous information registration because the first operator A1 or A2 registers no information in the production facility MC.

The production management system 1 includes the first operation instruction provider 200. In accordance with the production plan and the operating statuses of the production facilities MC, the first operation instruction provider 200 gives the first operator A1 or A2 an instruction to deliver the workpiece(s) W into and out of a predetermined one of the production facilities MC and acquires the operation status of each of the first operators A1 and A2. The delivery of the workpiece(s) W is included in the first operation. The first operation instruction provider 200 thus makes it possible to easily grasp the operation status of each of the first operators A1 and A2.

The management device 100 stores the process data (e.g., the NC programs and position correction amounts), the operating status information on the production facilities MC acquired from the production facilities MC, and the operation status information on the first operators A1 and A2 acquired from the input-output device 11 of the first operation instruction provider 200, such that these pieces of information are stored in association with each other. Using these pieces of information stored in association with each other makes it possible to carry out production in accordance with the production plan and to reduce occurrence of production errors. This results in enhanced production efficiency.

The management display 43 presents the information stored in the overall information memory 116 of the management device 100, such as the operating status information on each of the production facilities MC, the production plan, and the actual production. This enables the manager C to easily grasp the production status. The management display 43 is able to present the operation status of each of the first operators A1 and A2 in association with the operating status information on each of the production facilities MC, the production plan, and the actual production. The manager C is thus able to grasp the production status in association with the operation status of each of the first operators A1 and A2. This enables the manager C to grasp the production status in more detail, making it possible to carry out production in accordance with the production plan.

Each of the production facilities MC is provided with the information controller 55. The information controller 55 includes the facility status information acquirer 415 to acquire the operating status information on the production facility MC. The operating status information on the production facility MC includes at least one of: driving information on driving devices of the production facility MC detected by the status detector 54a; and information indicative of the status of the production facility MC detected by the status detector 54b.

The facility status information acquirer 415 is not only able to transmit the acquired information to the management device 100 on an as-is basis but also able to edit or analyze the acquired information so as to transmit the edited or analyzed data to the management device 100. The overall information memory 116 of the management device 100 stores various pieces of information (e.g., the edited or analyzed data) in association with other pieces of information. In particular, providing, in each of the production facilities MC, the facility status information acquirer 415 that is able to edit or analyze data results in enhanced real time data processing. Providing the facility status information acquirer 415 in each of the production facilities MC reduces data communication traffic from each of the production facilities MC to the management device 100. This also results in enhanced real time data processing. Consequently, the manager C is able to grasp the production status and malfunction(s) in the production facility or facilities MC at an earlier stage.

The management device 100 manages the life of each of the tools T (such as the shared tools Tc and the permanent tools Tp). When any one of the tools T (such as the shared tools Tc and the permanent tools Tp) attached to the production facility MC, into and out of which the workpiece(s) W is/are to be delivered, is a replacement target tool expected to shortly reach the end of its life, the management device 100 causes the first operation instruction provider 200 to provide an instruction to replace the replacement target tool. This prevents each of the tools T from reaching the end of its life during production process.

In particular, the management device 100 determines the tools T to be used to process the next workpiece(s) W in accordance with the production plan. When the tools T attached to the production facility MC, into and out of which the workpiece(s) W is/are to be delivered, include the tool T expected to reach the end of its life during processing of the next workpiece(s) W, the management device 100 regards this tool T as a replacement target tool that will shortly reach the end of its life, and causes the first operation instruction provider 200 to provide an instruction to replace the replacement target tool. This makes it possible to timely replace the replacement target tool when the tool is needed for the production process. Suppose that the tool T will shortly reach the end of its life but will not be used for a while. In such a case, there is no urgent necessity of replacing the tool T. The management device 100 thus prevents replacement of the tool T until the time at which timely replacement is enabled as mentioned above. Accordingly, the first operator A1 or A2 will not uselessly replace the tool T, resulting in significantly enhanced operation efficiency.

When the shared tools Tc attached to the production facility MC, into and out of which the workpiece(s) W is/are to be delivered, include the shared tool Tc that will not be used for the next process, the management device 100 causes the first operation instruction provider 200 to provide an instruction to replace the shared tool Tc. This makes it possible to constantly store, in the shared tool storage 32, the shared tool(s) Tc that will not be used for the next process. The management device 100 thus enables efficient use of infrequently used and/or expensive ones of the tools T.

When the first operator A1 or A2 has secured the cutter Tb to the tool holder Ta using the tool setter 31, the management device 100 transmits the information unique to the tool T to the CNC device 52 through the information controller 55. This makes it unnecessary for the first operator A1 or A2 to register the information unique to the tool T in the CNC device 52. Accordingly, the management device 100 makes it possible to store the latest information in the CNC device 52 when the cutter Tb is replaced. This results in enhanced operation efficiency and makes it possible to prevent adverse effects on the accuracy of machining the workpiece(s) W in the case where erroneous information is registered.

The management device 100 stores the operation capability of each of the first operators A1 and A2. The first operation instruction provider 200 gives the first operator A1 or A2 an instruction to deliver the workpiece(s) W into and out of a predetermined one of the production facilities MC in accordance with the production plan and the operation capability of each of the first operators A1 and A2. The management device 100 stores the operation capability of each of the first operators A1 and A2 in association with the operating status information on the production facilities MC. This enables the manager C to more appropriately grasp the current production status. If a delay in the actual production is caused by the operation capability of the first operator A1 or A2, the manager C would be able to easily track down the cause of the delay.

What is claimed is:

1. A production management system comprising:
    a plurality of production facilities each including a plurality of tools and a facility body to process, using the tools, a workpiece delivered into the facility body;
    a first operation instruction provider configured to
        give a first operator an instruction to perform an operation including delivering the workpiece into or out of a predetermined one of the production facilities via a display screen of an input-output device in accordance with a production plan and operating statuses of the production facilities, and
        acquire an operation status of the operation via operation of an interface of the input-output device by the first operator; and
    a management device configured to
        transmit, to a production facility into which the workpiece has been delivered by the first operator, process data for activation of the production facility including a numeric control (NC) program to control the facility body in accordance with a status of delivery of the workpiece into and out of each of the production facilities after the operation status indicates that the first operator has started the operation and before the operation status indicates that the first operator has finished the operation,
        store the process data, operating status information on the production facilities acquired from the production facilities, and operation status information on the operation acquired from the first operation instruction provider, such that these pieces of information are stored in association with each other.

2. The production management system according to claim 1, wherein
    each of the production facilities includes a detector configured to detect delivery of the workpiece into a respective production facility, and
    upon detection by the detector that the workpiece has been delivered into the respective production facility, the management device transmits, to the respective production facility, the process data associated with the workpiece delivered into the respective production facility.

3. The production management system according to claim 2, wherein the detector recognizes an identification code assigned to a member associated with the workpiece delivered into the respective production facility.

4. The production management system according to claim 1, further comprising a tool-unique information acquiring device configured to acquire tool-unique information unique to each of the tools,
    wherein the management device transmits, to the production facility, the tool-unique information included in the NC program.

5. The production management system according to claim 1, wherein
    with the workpiece secured to a pallet, the management device acquires a correction amount of a secured position of the workpiece relative to a reference position on the pallet, and
    the management device transmits, to the production facility, the correction amount associated with the workpiece delivered into the production facility.

6. The production management system according to claim 5, further comprising a second operation instruction provider to give a second operator an instruction to secure the workpiece to the pallet and acquire the correction amount via a display screen of an input-output device in accordance with the production plan,
    wherein the management device acquires the correction amount as a result of an operation performed by the second operator in accordance with the instruction provided from the second operation instruction provider, and transmits, to the production facility, the correction amount associated with the workpiece delivered into the production facility.

7. The production management system according to claim 1, wherein
    the first operation instruction provider gives the first operator an instruction to replace the tool attached to the predetermined production facility, into or out of which the workpiece is to be delivered, in addition to delivering the workpiece into or out of the predetermined production facility via the display screen,
    the management device manages life of each of the tools, and
    when the tools attached to the predetermined production facility, into or out of which the workpiece is to be delivered, include a replacement target tool expected to shortly reach the end of its life, the management device causes the first operation instruction provider to provide an instruction to replace the replacement target tool via the display screen.

8. The production management system according to claim 7, wherein
    the management device determines the tools to be used to process a next workpiece in accordance with the production plan, and
    when the tools attached to the predetermined production facility, into or out of which the workpiece is to be delivered, include the tool expected to reach the end of its life during processing of the next workpiece, the management device regards the tool as the replacement target tool expected to shortly reach the end of its life and causes the first operation instruction provider to provide the instruction to replace the replacement target tool via the display screen.

9. The production management system according to claim 7, wherein
    the production facilities include
        shared tools for shared use among the production facilities, the shared tools being included in the tools, and
        permanent tools each solely holdable by an associated one of the production facilities, the permanent tools being the tools other than the shared tools, and
    when the shared tools attached to the predetermined production facility, into or out of which the workpiece is to be delivered, include the shared tool that will not be used for a next process, the management device causes the first operation instruction provider to provide an instruction to replace the shared tool via the display screen.

10. The production management system according to claim 1, wherein
    the production facilities each include
        a facility status information acquirer,
        a first status detector, and
        a second status detector, the facility status information acquirer is configured to acquire the operating status information on the production facility, the operating status information includes at least one of driving information on a driving device of the production facility detected by the first status detector and information indicative of a status of the production facility detected by the second status detector, and the management device stores the operating status information acquired by the facility status information acquirer, the operating status information being stored in association with the process data.

11. The production management system according to claim 1, further comprising a management display configured to present information stored in the management device, the information including the operating status information on each of the production facilities, the production plan, and an actual production.

12. The production management system according to claim 1, wherein the first operator includes a plurality of first operators, the management device stores an operation capability of each of the first operators, and the first operation instruction provider gives each of the first operators an instruction to deliver the workpiece into or out of the production facilities via the display screen in accordance with the production plan and the operation capability of each of the first operators.

13. The production management system according to claim 3, wherein the member is an ID tag, and the detector detects delivery of the workpiece into the respective production facility by reading the ID tag.

14. The production management system according to claim 13, wherein when the detector detects delivery of the workpiece into the respective production facility by reading the ID tag, the management device transmits an NC program to control the facility body into which the workpiece has been delivered to the respective production facility.

15. The production management system according to claim 3, wherein the member is an ID tag associated with a pallet, and the detector detects delivery of the workpiece into the respective production facility by reading the ID tag.

16. The production management system according to claim 15, wherein when the detector detects delivery of the workpiece into the respective production facility by reading the ID tag, the management device transmits an NC program to control the facility body into which the workpiece has been delivered to the respective production facility.

17. The production management system according to claim 12, wherein the operation capability of each of the first operators includes a type of operation each of the first operators is able to perform, an average operation speed for each type of operation, an operation speed for each type of operation, and an operation level concerning operation quality.

18. A production management system comprising:

a plurality of production facilities each including a plurality of tools and a facility body to process, using the tools, a workpiece delivered into the facility body; and circuitry configured to:

give a first operator an instruction to perform an operation including delivering the workpiece into or out of a predetermined one of the production facilities via a display screen of an input-output device in accordance with a production plan and operating statuses of the production facilities;

acquire an operation status of the operation via operation of an interface of the input-output device by the first operator;

transmit, to a production facility into which the workpiece has been delivered by the first operator, process data for activation of the production facility including a numeric control (NC) program to control the facility body in accordance with a status of delivery of the workpiece into and out of each of the production facilities after the operation status indicates that the first operator has started the operation and before the operation status indicates that the first operator has finished the operation; and store the process data, operating status information on the production facilities acquired from the production facilities, and acquired operation status information on the first operator, such that these pieces of information are stored in association with each other.

* * * * *